Jan. 26, 1971 W. G. SCHMIDT 3,559,166

PROBABILITY ERROR CORRECTOR AND VOLTAGE DETECTOR

Filed June 28, 1968 2 Sheets-Sheet 1

INVENTOR
WILLIAM G. SCHMIDT

BY Sughrue, Rothwell, Mion, Zinn & Macpeak
ATTORNEYS

PROBABILITY ERROR CORRECTOR AND VOLTAGE DETECTOR

Filed June 28, 1968 2 Sheets-Sheet 2

INVENTOR
WILLIAM G. SCHMIDT

BY Sughrue, Rothwell, Mion, Zinn & Macpeak
ATTORNEYS

United States Patent Office 3,559,166
Patented Jan. 26, 1971

3,559,166
PROBABILITY ERROR CORRECTOR AND VOLTAGE DETECTOR

William G. Schmidt, Rockville, Md., assignor to Communications Satellite Corporation, a corporation of the District of Columbia

Filed June 28, 1968, Ser. No. 741,131
Int. Cl. H04l *1/00;* G08c *25/00*
U.S. Cl. 340—146.1 22 Claims

ABSTRACT OF THE DISCLOSURE

A correlation detector selects a data vector from a store of data vectors on the basis of the probability that the selected data vector was the message transmitted to the detector. The second most probable data vector is also selected and stored along with the most probable data vector. After a plurality of correlation operations the series of most probable data vectors is checked for errors. If an error is detected it is corrected on the basis of probability. The data vector and the second most probable data vector having the closest probabilities are switched causing one of the second most probable data vectors to be inserted into the series of most probable data vectors. The most probable and second most probable data vectors are selected by a primary and secondary voltage selector. A transistorized circuit receives a plurality of different input voltages and detects which input is the most positive, which is the second most positive, etc. A variation allows detection of the most negative, second most negative, smallest, etc. A bank of transistor circuits is arranged having a common output. The extreme voltage is passed to the common output by the forward biased emitter-base path of one of the transistors and reverse biases all transistors not connected to the extreme voltage input. A bank of switches responsive to the detection of the extreme voltage passes all but the extreme voltage through a second bank of transistor circuits similar to the first.

BACKGROUND OF THE INVENTION

It is known in the prior art that low error digital communications can be achieved by coding techniques which use the process of correlation detection in the receiver. Basically, at the transmission end a set of data subsequences, referred to as data vectors, is coded into a set of code vectors on a one to one ratio. For example, a data subsequence may be a binary word of length $k$ bits and is transformed into a binary word of length $n$ bits, where $n>k$. Thus, the available set of code vectors $c_1(t)$ through $c_M(t)$, is equal to the possible number of data vectors $d_1(t)$ through $d_M(t)$, where $M=2^k$. The code vector is then transmitted. For optimal decoding using correlation detection the set of code vectors is selected so that there is a high degree of auto-correlation between the code vectors and a lower degree of cross-correlation, i.e., $$\left|\frac{1}{T}\int_0^T c_i(t)\cdot c_i(t)dt\right| > \left|\frac{1}{T}\int_0^T c_i(t)\cdot c_j(t)dt\right|$$

for any $i$ and $j$ ($i \neq j$), and where T is the period of the code vector.

The received vector $y(t)$ is unknown and is detected in the correlation detector by correlating it with each of the stored code vectors. Thus, there is a set of M multipliers and integrators which compute the M quantities, $$Z_i=\frac{1}{T}\int_0^T y(t)\cdot c_i(t)dt \quad (i=1, 2, 3 \ldots M)$$

and the greatest $Z_i$ is selected as corresponding to the signal most probably transmitted. That is, if $z_5$ is the greatest, then $c_5(t)$ was the most likely code vector sent and the receiver selects $d_5(t)$ from a stored set of data vectors as the properly received data vector. The type of receiver mentioned above is a receiver having a correlation detector with a set of M code vectors. The prior art described thus far is disclosed in greater detail in chapter 7 and the references cited at the end of chapter 7 of "Digital Communications With Space Applications," edited by Solomon W. Golomb, copyright 1964 by Prentice-Hall, Inc.

It is also known in the prior art that errors in a series of messages or data vectors can be detected by use of error detecting codes. Basically, a block of data which may comprise a series of $p$ data vectors is applied to an error code generator which adds a group of error-detecting bits to the series of data forming a block of data. The error detecting code povides a vehicle for detection of the errors in the block of data. Error detecting codes of one type are known as BCH codes and are described in chapter 9 of "Error Correcting Codes" by W. W. Peterson, published by MIT Press and Wiley & Sons, Inc., copyright 1961.

Although digital transmission utilizing correlation detectors of the type described above provides relatively low-error communication in the presence of Gaussian noise, the communication is not completely error free. Errors in a series of data vectors can be detected by use of the BCH codes described above, with the BCH code being added to a series of data vectors prior to translating the block of data into a series of code vectors. When the block of data is reformed at the output of the correlation detector it is sent to a BCH error detector. Although a limited number of errors can thus be detected by this method it is preferable to be able to pinpoint the error in the block of data and provide correction. Error *correcting* codes are known for some series of data but they require a relatively large amount of equipment and computation time.

SUMMARY OF THE INVENTION

In accordance with the present invention error correction is provided in a receiver having a correlation detector following the indication that an error has occurred. The correction of a limited number of vectors in the receiver output is based on the fact that in a correlation detection receiver each data vector selected to be sent to the output is selected on a most likely basis. That is, the data vector corresponding to the largest correlation output for any correlation operation is the message most likely to have been sent from the transmission end. In the present invention the data vector corresponding to the second largest correlation output for each correlation operation is stored in a secondary storage means. The latter data vectors represent the second most likely message to have been transmitted. Also, for each correlation operation the largest correlation output is compared to the second largest correlation output. Since the correlation outputs represent the relative likelihood of their corresponding data vector having been transmitted, the difference between the largest and second largest is a measure of the likelihood that the second selected data vector is the correct one, i.e. the smaller the difference the more probable that a resulting error can be corrected by exchanging the second selected data vector for the initially selected data vector, both resulting from the correlation operation providing the smallest output difference. As used herein the phrase "correlation operation" means the correlation of single received code vector with every one of the set of stored code vectors $[c_1(t)-c_M(t)]$ resulting in outputs $z_1(t)$ through $Z_M(t)$.

The highest and second highest correlation outputs are selected by a voltage detector. The detector comprises a first means responsive to a plurality of input voltages for providing a voltage output equal to the extreme of the input voltages and an address output indicating the input terminal which receives the extreme voltage, a switching means which is responsive to the detected address output of the first means for passing all of the input voltages except the extreme input voltage to a second plurality of input terminals, and a second means which is responsive to the second plurality of input voltages for providing a voltage output equal to the extreme of the second plurality of input voltages and an address output which indicates the input terminal receiving the extreme of the second plurality of input voltages.

DETAILED DESCRIPTION OF THE DRAWING

Figure 1:
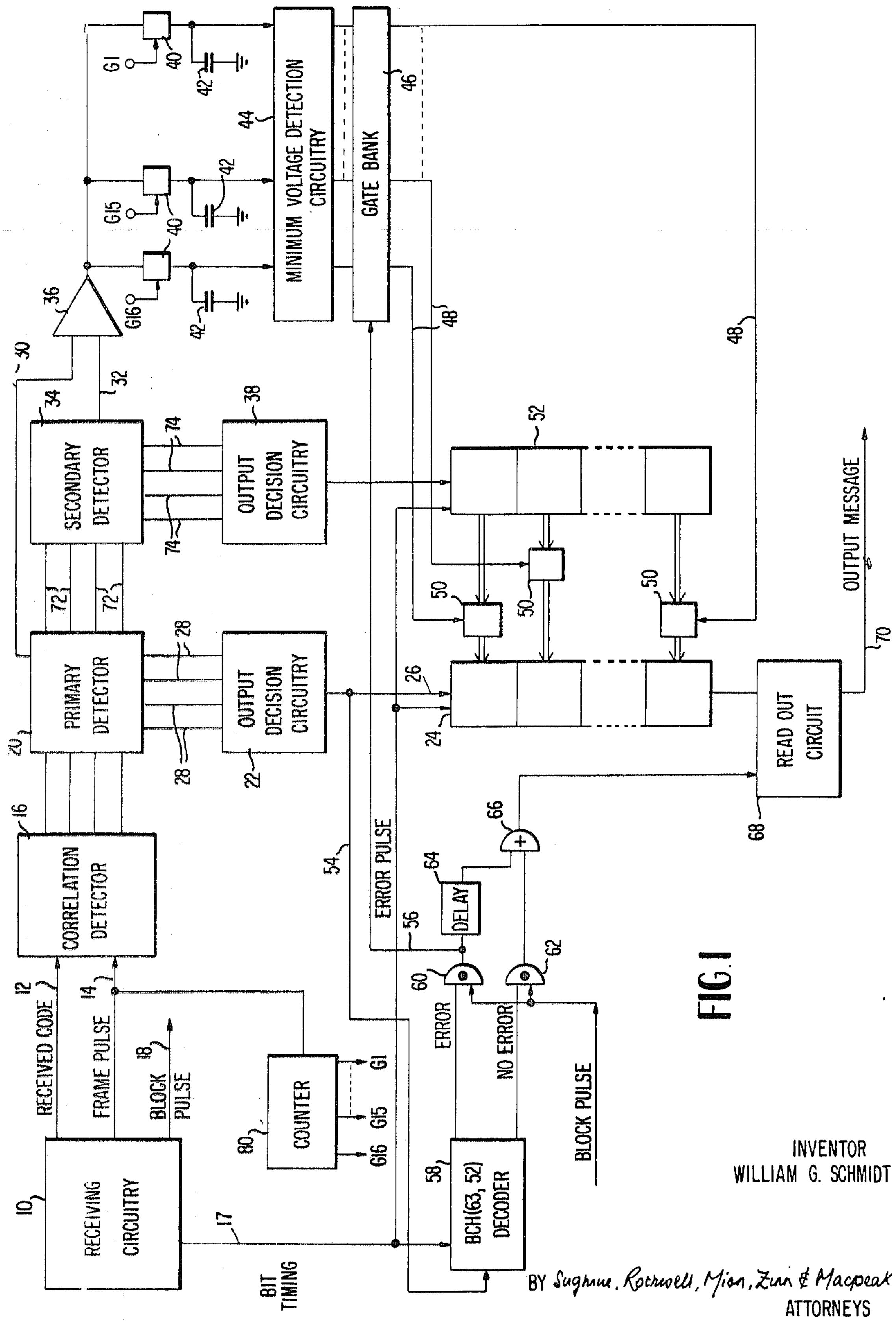
FIG. 1 is a block diagram of a preferred embodiment of a probability error corrector.

Before describing FIG. 1, certain assumptions are made for the purpose of aiding in the explanation of a specific embodiment. It will be apparent to one of ordinary skill in the art that the invention is not limited to the assumption made herein.

(a) Each data vector is 4 bits in length.

(b) Orthogonal coding of the 4-bit data vector into an 8-bit code vector is used. This type of coding has the properties described in background section above.

(c) The error detection coding to be combined with the orthogonal coding is of the BCH (63, 52) type which is guaranteed to detect any 4 bits in error within a 63 bit code word of which 52 are information and 11 are a polynomial code error detection word. A dummy bit is added to make the block have a length of 64 bits which is equal in length to a 16 data vectors.

As shown in FIG. 1, a receiver 10 receives incoming signals and provides a received code output $y(t)$ and frame pulses to a correlation detector 16 via leads 12 and 14, respectively. The frame pulses provide a time indication of the beginning of each received code vector. The receiver circuitry 10 also provides block pulses via lead 18 and bit timing pulses via lead 17. The block pulses frame a block of data vectors which in the specific example described herein is 16 data vectors or 64 bits long. The block pulse may be generated by an accumulator which provides one output for every 16 frame pulses applied thereto. The bit timing pulses are essentially clock pulses occurring at the received data bit rate. They are recovered from the received data in a known manner and provide clock timing to the other circuits to which they are connected. Receivers of the type which receive digitally coded information and provide the digital output, framing output pulses and bit timing pulses are known in the digital communications art.

The correlation detector 16 operates in a manner well known in the art to provide correlation outputs $$z_i=\frac{1}{T}\int_0^T y(t)\cdot c_i(t)dt(i=1, 2 \ldots M)$$

The correlation detector includes a store of all possible code vectors $c_i(t)$, $i=1, 2 \ldots M$ where M is the number of code vectors which can be detected by the correlation detector. It also includes M correlation channels, each having a multiplier and an integrator. Each correlation channel multiplies the input $y(t)$ by a different one of the sorted code vectors and integrates the output. At the beginning of each new received code $y(t)$, the frame pulse dumps the capacitors which are part of the integrators and a new correlation operation begins. Thus, the correlation outputs are $$z_i(i=1, 2 \ldots M)$$

with the largest $z_i$ indicating that $c_i(t)$ is the most likely code to have been transmitted.

Prior art correlation detectors also include apparatus which detects the largest $z_i$ for each correlation operation and sends the corresponding data vector $d_i(t)$ to the output. This apparatus is illustrated by a primary detector 20 and an output decision circuitry 22. The circuitry may be storage circuitry in which the data vectors $d_1(t)$ through $d_M(t)$ are wired into the system. The primary detector senses that $z_k$ is the maximum correlation output and addresses the output decision circuitry 22 via the $k^{th}$ address lead 28 to read out data vector $d_k(t)$ on output lead 26.

In accordance with the present invention the output data vectors on lead 26 are applied to a 64 bit primary shift register 24 capable of storing N data vectors, wherein N=16 for the specific example described herein. At the same time the primary detector 20 is detecting that $z_k$ is maximum for a particular correlation operation, it passes, via leads 72, to a secondary detector 34 all of the correlation outputs $z_i$ but $z_k$ is blocked. The secondary detector 34 detects the maximum input thereto which is the second most maximum correlation output $z_p$. The secondary detector 34 then provides an address output on the $p^{th}$ address lead 74 to read out the data vector $d_p(t)$ from the output decision circuit 38. The output decision circuit 38 contains the same stored data vectors as those in circuit 22. As an alternative to the two decision circuits a single data vector storage unit may be used with double address inputs and double outputs respectively.

The data vectors read out of decision circuitry 38 are referred to herein as the secondary data vectors and are applied to a secondary shift register 52 of the same length as shift register 24. At the end of sixteen correlation operations shift register 24 contains the sixteen primary data vectors and shift register 52 contains the corresponding secondary data vectors. The shift register storage locations are interconnected by gates 50, which, when energized, transfer a secondary data vector from correlation operation *n* into the position presently occupied by the primary data vector from correlation operation *n*. Thus, when one of the gates 50 is energized a secondary data vector is substituted for a primary data vector.

Substitution is made only if there is an indication that an error exists in the block of 16 data vectors entered into shift register 24. As stated above, error detection is provided by using known error detecting techniques. Specifically, a BCH error detecting code enables detection in the BCH decoder 58 that an error has occurred. The decoder 58 receives the data vectors from output decision circuitry 22 and provides an error or no error output to AND gates 60 and 62, respectively. The decoder 58 is interrogated by a block pulse at the end of 16 received codes. If there is no error at this time, the no error output from an AND gate 62 passes through an OR gate 66 and energizes a read out circuit 68 to read out the data in shift register 24. If there is an error at this time, the error output from AND gate 60 energizes circuitry, to be described hereafter, which selects one of he secondary data vectors to be substituted for a primary data vector. The output of AND gate 60 also is applied to the read out circuit via a delay means 64 and an OR gate 66 to read out the contents of shift register 24. The delay provided by delay means 64 is long enough to allow the selected secondary word to be transferred to the shift register 24.

Figure 2:
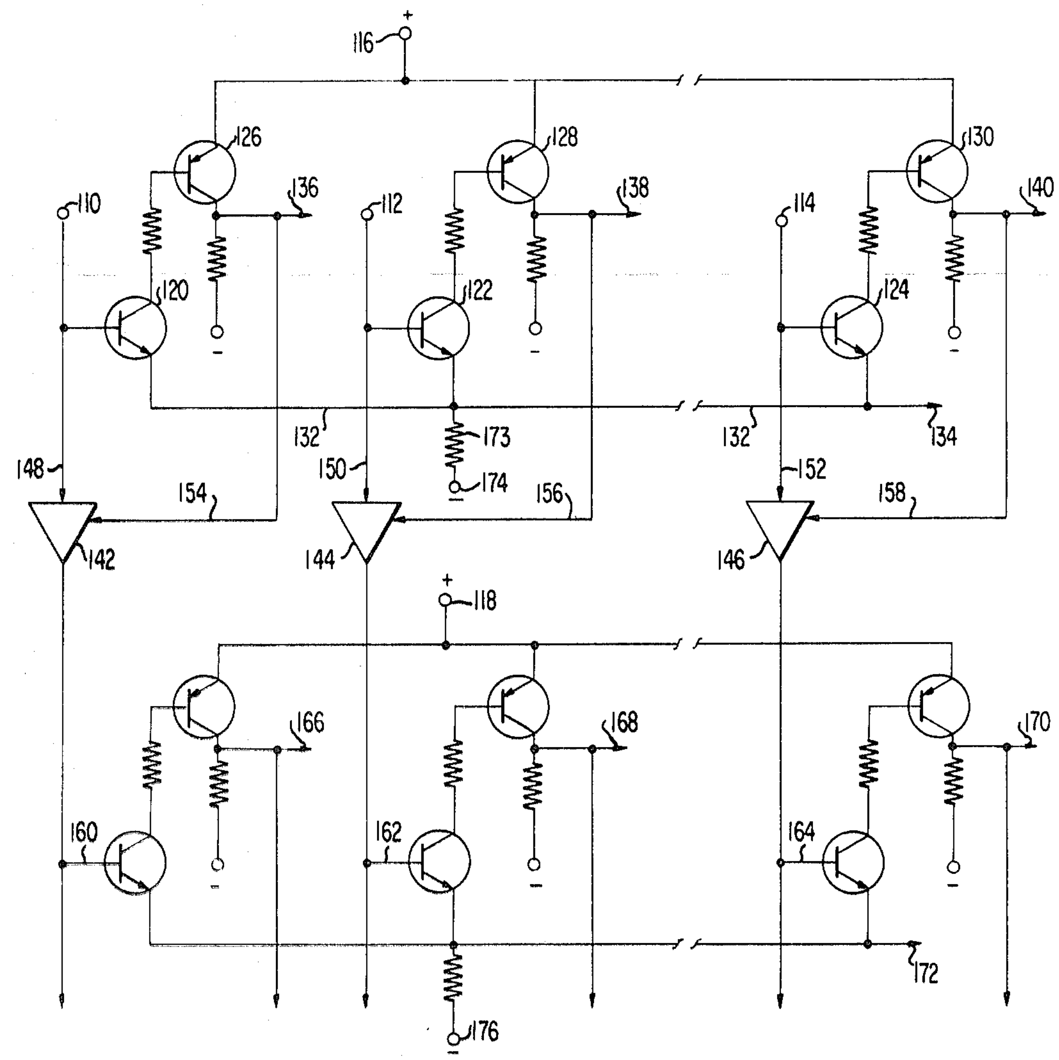
FIG. 2 is a schematic diagram of a preferred embodiment of a circuit for detecting the input voltages in the order of most positive, second most positive, etc., amplitude.

The detectors 20 and 34 also provide outputs via leads 30 and 32 which are proportional to the maximum and second most maximum correlation outputs, respectively. A preferred circuit suitable for use as the combined primary and secondary detectors is shown in FIG. 2 and will be described more fully below. The maximum correlation output voltage $z_k$, and second most maximum correlation output voltage $z_p$, are applied to a difference amplifier 36 whose output $k(z_k-z_p)$ is passed through one of a plurality of identical analog gates 40 to one of a plurality of storage capacitors 42. The difference voltage resulting from each correlation operation is stored on a capacitor corresponding to the particular correlation operation. Correspondence is assured by providing a sequence of properly timed gating voltages G1 through G16 which correspond respectively to the correlation operations 1 through 16. The latter gating inputs may be generated by a pulse counter 80 which counts the frame pulses and resets after the $16^{th}$ input thereto.

If an error exists in one of the data vectors in shift register 24, the most likely candidate for that error is the one selected as the result of the correlation operation which also resulted in the smallest stored difference voltage $K(z_k-z_p)$. A minimum voltage detection circuit 44 provides an output address voltage on the one of its 16 output leads which corresponds to the input terminal receiving the minimum voltage. When a gate bank 46 is gated on by the error pulse on lead 56 the address output selects the proper gate 50 via one of a plurality of leads 48 to initiate transfer of a secondary data vector into the primary shift register.

As an alternative to the example described above, the difference voltages may be converted to digitally represented quantities and stored digitally. Also, the correlator outputs could be converted to digitally represented quantities prior to subtraction, with a digital subtractor being substituted for the analog difference amplifier.

Also, the invention could be extended by checking for additional errors. Following the correlation operation described above, if the probability of an error still existing is unacceptably high, the complete block may be recycled after the attempted error correction through the BCH decoder. The decoder's error output could then be used to verify if there is still an error in the word delivered.

The detector circuitry of FIG. 2 receives voltages which are correlation detector output voltages in the probability error corrector of FIG. 1, at input terminals 110, 112, and 114. It will be apparent that three input terminals are illustrated only for purposes of explanation and that the invention is capable of detecting and sorting out voltages on a much larger number of input terminals. Each of the input terminals is connected to a dual transistor circuit which forms a part of the first voltage detecting means or primary detector. Input terminal 110 is connected to the dual transistor circuit comprising transistors 120 and 126; input terminal 112 is connected to the dual transistor circuit comprising transistors 122 and 128; and input terminal 114 is connected to the dual transistor circuit comprising transistors 124 and 130. All of the dual transistor circuits described are identical. The emitters of PNP transistors 126, 128 and 130 are connected to a source of positive potential at terminal 116; the emitter terminals of NPN transistors 120, 122 and 124 are connected together via lead 132 and to a voltage detection output terminal 134. The emitters are also connected to a source of negative potential at terminal 174 via biasing resistor 173. The address output terminals 136, 138 and 140 are connected respectively to the collector terminals of transistors 126, 128 and 130. The latter collectors are also connected via individual resistors to a source of negative potential.

The first detection means operates to translate the maximum input voltage to the voltage detection output terminal 134 and to provide a positive output on one of a plurality of address output terminals 136, 138 and 140, which is associated with the input terminal receiving the maximum input voltage. Assuming that the voltage at input terminal 112 is maximum, NPN transistor 122 becomes forward biased and the input voltage 112 is translated to the emitter of transistor 122, which is in turn connected to the voltage output terminal 134. The voltage on lead 132, being larger than all of the other input voltages, reverse biases the base emitter junctions of transistors 120 and 124, thereby preventing the latter transistors from conducting. Transistors 126 and 130, associated respectively with non-conducting transistors 120 and 124, are also non-conducting and, therefore, the address output terminals 136 and 140 remain in the low voltage state. When transistor 122 conducts, it turns on transistor 128 thereby placing address output terminal 138 in the high or positive voltage state. A positive voltage on terminal 138 indicates that the maximum voltage, which now appears at voltage output terminal 134, was received at terminal 112.

Input terminals 110, 112 and 114 are also connected via leads 148, 150 and 152, respectively, and normally closed switches 142, 144 and 145, respectively, to individual dual transistor circuits of a second maximum voltage detection means or secondary detector. The individual dual transistor circuits of the second maximum voltage detection means are identical to those of the first voltage detection means described above and will not be described in detail. The switches 142, 144 and 146 respond to a positive input voltage on leads 154, 156 and 158, respectively, to block the input voltage from appearing at the output terminal. Thus, for the example described above wherein the maximum input voltage is applied to input terminal 112, the positive output voltage on address output terminal 138 causes switch 144 to block the input voltage at terminal 112 from passing to input 162 of the second maximum voltage detection means. Thus, the second most positive voltage detection means does not receive the most positive voltage and makes a decision based upon all other inputs. Assuming that the input voltage at terminal 110 is larger than that at terminal 114, the second maximum voltage detection circuitry will provide an output voltage at terminal 172 which is substantially equal to the input voltage at terminal 110, and will also provide a positive output voltage on the address output terminal 166 which indicates that the second largest voltage was received at the terminal 110. If the circuit of FIG. 2 is used for the primary and secondary detectors of FIG. 1, the input terminals 110, 112 and 114 will be connected to the correlation detector outputs, the address outputs 136, 138 and 140 will gate out the selected stored data vector from decision circuitry 22, the address outputs 166, 168 and 170 will gate out the selected stored data vector from decision circuitry 38, and the output voltages at terminals 134 and 172 will be applied to the difference amplifier 36.

From the description of the invention given above, it will be apparent to anyone having ordinary skill in the art that additional maximum voltage detection circuits identical to the first and second described above can be provided to detect the third most maximum voltage, fourth most maximum voltage, etc. Between each maximum voltage detection circuit there is a bank of electronic switches for blocking the voltage detected by the preceding detection circuitry from the succeeding detection circuitry. The switches, such as switches 142, 144 and 145 may be any type of switch which passes the input voltage to the output terminal thereof unless the control input terminal receives a positive input voltage. Electronic switches are preferable.

Figure 3:
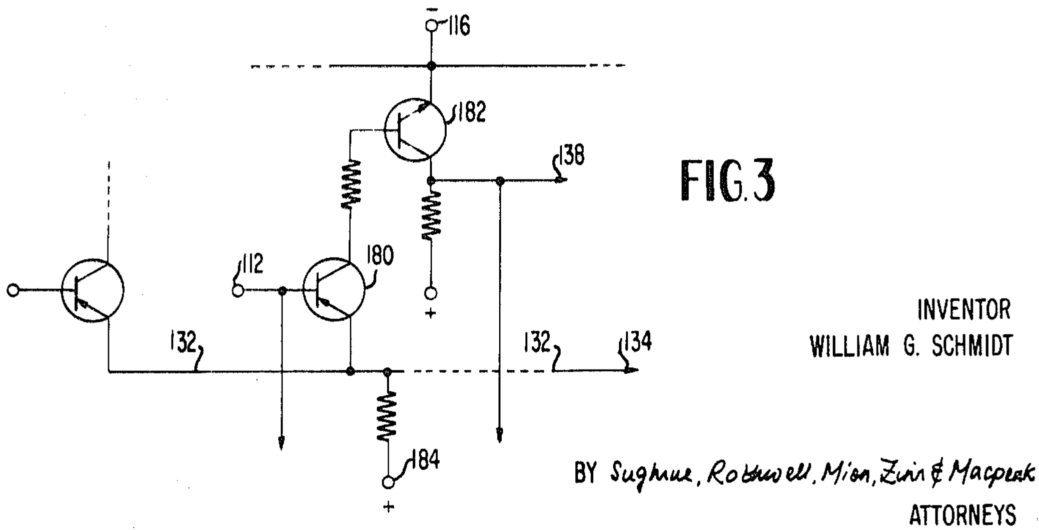
FIG. 3 is a schematic diagram illustrating a variation of the circuit of FIG. 2 to allow detection of input voltages in the order of most negative, second most negative, etc.

A variation in the dual transistor circuits of FIG. 2 which will enable the apparatus to receive negative voltages and detect the voltages in the order of most negative, second most negative, etc., is illustrated in FIG. 3, wherein only one of the dual transistor circuits is illustrated and numerals which are common to FIGS. 2 and 3 indicate the common parts of the most positive and most negative voltage detectors. A PNP transistor 180 is substituted for the NPN transistor 122, and NPN transistor 182 is substituted for the PNP transistor 128, and the emitters of the transistors are connected to a source of positive potential at terminal 184 rather than to a source of negative potential at terminal 174. The operation is in a substantially identical manner with the exception that the most negative input voltage forward biases the associated input transistor. Therefore, the most negative input voltage appears on lead 132 which is connected to the voltage output terminal 134 and reverse biases all of the other input transistors. Note that if all inputs are positive the most negative would be the least positive input. Assuming that input terminal 112 receives the most negative input voltage, transistor 180 will conduct, thereby causing transistor 182 also to conduct. When transistor 182 conducts, the address output terminal 138 becomes negative, thereby indicating that the most negative voltage input was received at input terminal 112. The electronic switches interconnecting the stages of voltage detection are chosen in this case to pass the input applied thereto when the control terminal carries a positive potential and blocks the input when the control terminal carries a negative potential. The circuit of FIG. 3 may be used for the minimum voltage detection circuitry 44 of FIG. 1.

While the invention has been particularly shown and described with reference to a preferred embodiment thereof, it will be understood by those skilled in the art that various changes in form and details may be made therein without departing from the spirit and scope of the invention.

What is claimed is:

1. In a communications receiver of the type which receives a plurality of code vectors, correlates each of said received code vectors with a set of all possible code vectors and generates correlations values, one for each code vector in said set, having a relation to the probability of identity between the received code vector and each respective one of said set of code vectors, selects a data vector, from a set of data vectors, corresponding to the code vector resulting in the maximum correlation value for a given received code, a system responsive to an indication of error in a group of selected data vectors for correcting a said group of selected data vectors, comprising:

(a) means for storing said selected data vectors to form said group of selected data vectors, (b) means for detecting the second most maximum correlation value resulting from the correlation of each code vector, (c) means for detecting the closest match for any received code vector between the maximum correlation value and the second most maximum correlation value, (d) means responsive to said detecting closest match for selecting a most likely secondary data vector from said set of data vectors, said most likely secondary data vectors being the one of said set of data vectors which corresponds to the code vector that resulted in the second most maximum correlation value that generated said detected closest match, and (e) means for substituting said most likely secondary data vector into said group of selected data vectors for the selected data vector which corresponds to the maximum correlation output which resulted in said detected closest match.

2. A system as claimed in claim 1 wherein said means for detecting comprises:

(a) means for detecting and storing the difference between the two largest correlation values resulting from the correlation detection of each received code vector, and (b) means responsive to said stored differences for providing an output address indicating the particular one of said selected data vectors which correspond to the smallest stored difference.

3. A system as claimed in claim 2 wherein said means for selecting comprises:

(a) means responsive to the second most maximum correlation values for said received code vectors respectively for selecting a group of alternate data vectors, each alternate data vector corresponding to the code vector resulting in said second most maximum correlation value, and (b) storage means for storing said alternate selected data vectors.

4. A system as claimed in claim 3 wherein said means for substituting comprises:

means responsive to said output address indication for transferring the alternate selected data vector at a corresponding address in said means for storing said alternate selected data vectors to the corresponding address in said means for storing said selected data vector, wherein said alternate selected data vector is the most likely secondary data vectors.

5. An error correcting decoder comprising:

(a) correlation detection means adapted to receive code vectors for correlating each received code vector with each one of a set of stored code vectors, each correlation operation resulting in a plurality of correlation outputs, (b) means for detecting the maximum and second most maximum correlation outputs for each correlation operation from said plurality of correlation outputs, (c) first means responsive to the maximum correlation output from each correlation operation for generating a data vector corresponding to the code vector which resulted in the maximum correlation output, (d) primary data vector storage means for storing N data vectors generated by said first means in positions corresponding to the sequence of generation, (e) second means responsive to the second most maximum correlation output from each correlation operation for generating a data vector corresponding to the code vector which resulted in the second most maximum correlation output, (f) secondary data vector storage means for storing N data vectors generated by said second means in positions corresponding to the sequence of generation, (g) transfer means, each connected between corresponding storage locations of said primary and secondary storage means, for substituting, when gated on, a data vector in said secondary storage means for a data vector in said primary storage means, each of said latter data vectors being generated as the result of the same correlation operation, (h) means for subtracting the second most maximum correlation output from the maximum correlation output for each correlation operation and storing N difference values resulting therefrom in a sequence corresponding to the sequence of generation of said data vectors, (i) means responsive to said stored difference values for selecting, when gated on, the smallest difference value and providing a gating signal on a corresponding one out of N output terminals, said N output terminals connected to the corresponding N transfer means, and (j) means responsive to N data vectors generated by said first means for providing a gating signal to gate on said means for selecting and providing when there is an error in said series of N data vectors.

6. An error correcting decoder as claimed in claim 5 wherein said first means comprises:

(a) a store of a set of data vectors, one for each correlation output, (b) a maximum voltage detector means, responsive to said correlation output.

7. An error correcting decoder as claimed in claim 6 wherein said second means comprises, a second maximum voltage detector means responsive to all of said correlation outputs but said maximum correlation output for selecting the second most maximum correlation output and initiating the readout of a data vector in said store corresponding to the correlation output which is second most maximum.

8. An error correcting decoder as claimed in claim 7 wherein said primary data vector storage means and said secondary data vector storage means are first and second shift registers, respectively, adapted to receive the data vectors read out of said store corresponding to the maximum and second most maximum correlation outputs respectively.

9. An error correcting decoder comprising:
(a) a correlation detection means adapted to receive code vectors for correlating each received code vector with each one of a set of stored code vectors, each correlation operation resulting in a plurality of correlation output voltages,
(b) circuit means responsive to said plurality of correlation output voltages resulting from each correlation operation for detecting the maximum and second most maximum correlation output voltages and for providing an address indication of the stored code vectors which, when correlated with said received code vector, produced said maximum correlation output voltages, said circuit means comprising,
  (i) a plurality of input terminals having said correlation output voltages connected thereto,
  (ii) a second plurality of input terminals,
  (iii) first means responsive to said correlation output voltages for providing a first voltage output equal to the maximum of said correlation output voltages and a first address output indicating the input terminal which received said maximum voltage,
  (iv) switching means responsive to said address output of said first means for connecting all of said correlation output voltages to said second plurality of input terminals except for said maximum correlation output voltage, and
  (v) second means responsive to said correlation output voltages applied to said second plurality of input terminals and connected thereto for providing a second voltage output equal to the maximum of said voltages applied to said second input terminals and a second address output indicating which of the second plurality of input terminals received the maximum voltage,
(c) primary and secondary data storage means for storing selected data vectors corresponding to said set of stored code vectors, said primary and secondary storage means containing corresponding data locations wherein data vectors relating to the same correlation operation are stored,
(d) means responsive to said first address output for entering into said primary storage means a data vector corresponding to the code vector from said set of stored code vectors, which resulted in said maximum correlation output voltage,
(e) means responsive to said second address output for entering into said secondary storage means a data vector corresponding to the code vector from said set of stored code vectors, which resulted in said second most maximum correlation output voltage,
(f) comparison means responsive to said first and second voltage outputs from said circuit means for comparing and storing the difference between said first and second voltages for each correlation operation, and
(g) means responsive to the detection of an error in said data vectors entered into said primary storage means and responsive to said stored difference voltages, for substituting the said data vector entered into said secondary storage means as a result of the correlation operation resulting in the minimum of said difference voltages into the corresponding location of said primary storage means.

10. The combination as claimed in claim 9 wherein said maximum correlation voltages are the most positive voltages applied to said plurality of input terminals.

11. The combination as claimed in claim 10 wherein said first means comprises a voltage detection output terminal, a plurality of input transistors having their emitter terminals connected to said voltage detection output terminal, means for biasing said plurality of transistors, means connecting said input voltages to the bases of said transistors, respectively, for causing only the transistor receiving the most positive input voltage to transfer the most positive voltage to said voltage detection output terminals, and reverse bias the emitter-base junctions of all the other ones of said plurality of input transistors.

12. The combination as claimed in claim 11 wherein said first means further comprises a plurality of address output terminals and a plurality of address transistors connected respectively between said input transistors and said plurality of address output terminals, each of said address transistors being responsive to the conduction of the associated input transistor for providing an address output indication on the associated address output terminal.

13. The combination as claimed in claim 12 wherein said second means comprises circuitry identical to said first means.

14. A circuit responsive to a plurality of input voltages on plural input terminals for detecting at least the most extreme and second most extreme input voltages and for providing an electronic address indication of at least the input terminals receiving the extreme and second most extreme input voltages comprising:
(a) first means responsive to said input voltages for providing a voltage output equal to the extreme of said input voltages and an address output indicating the input terminal which received said extreme voltage,
(b) switching means responsive to said address output of said first means for connecting all of said input voltages to a second plurality of input terminals except for said extreme input voltage, and
(c) second means responsive to said second plurality of input voltages for providing a voltage output equal to the extreme of said second plurality of input voltages and an address output indicating which of the second plurality of input terminals received the extreme of said second plurality of input voltages.

15. A circuit as claimed in claim 14 wherein said extreme voltages are the most positive input voltages.

16. A circuit as claimed in claim 15 wherein said first means comprises a voltage detection output terminal, a plurality of input transistors having their emitter terminals connected to said voltage detection output terminal, means for biasing said plurality of transistors, means connecting said input voltages to the bases of said transistors, respectively, for causing only the transistor receiving the most positive input voltage to turn on, transfer the most positive voltage to said voltage detection output terminal, and reverse bias the emitter-base junctions of all the other ones of said plurality of input transistors.

17. A circuit as claimed in claim 16 wherein said first means further comprises a plurality of address output terminals and a plurality of address transistors connected respectively between said input transistors and said plurality of address output terminals, each of said address transistors being responsive to the conduction of the associated input transistor for providing an address output indication on the associated address output terminal.

18. A circuit as claimed in claim 16 wherein said second means comprises circuitry identical to said first means.

19. A circuit as claimed in claim 14 wherein said extreme voltages are the most negative input voltages.

20. A circuit as claimed in claim 19 wherein said first means comprises a voltage detection output terminal, a plurality of input transistors having their emitter terminals connected to said voltage detection output terminal, means for biasing said plurality of transistors, means connecting said input voltages to the bases of said transistors, respectively, for causing only the transistor receiving the most negative input voltage to turn on, transfer the most negative input voltage to said voltage detection output terminal, and reverse bias the emitter base junction of all the other ones of said plurality of input transistors.

21. A circuit as claimed in claim 20 wherein said first means further comprises a plurality of address output terminals and a plurality of address transistors connected respectively between said input transistors and said plurality of address output terminals, each of said address transistors being responsive to the conduction of the associated input transistor for providing an address output indication on the associated address output terminal.

22. A circuit as claimed in claim 21 wherein said second means comprises circuitry identical to said first means.

References Cited

UNITED STATES PATENTS

| | | | |
|---|---|---|---|
| 3,299,425 | 1/1967 | Smith et al. ------- | 343—100.7 |
| 3,412,334 | 11/1968 | Whitaker --------- | 235—181X |

MALCOLM A. MORRISON, Primary Examiner

C. E. ATKINSON, Assistant Examiner

U.S. Cl. X.R.

235—181; 340—15.5; 343—100.7